United States Patent [19]

Vermeulen

[11] 4,199,252
[45] Apr. 22, 1980

[54] PHOTOGRAPHIC ENLARGING EXPOSURE METERS

[76] Inventor: Dirk J. Vermeulen, 86 Hamilton Ave., Craighall Park, Johannesburg, Transvaal Province, South Africa

[21] Appl. No.: 944,163

[22] Filed: Sep. 20, 1978

[30] Foreign Application Priority Data

Sep. 20, 1977 [ZA] South Africa .................. 77/5612

[51] Int. Cl.² ........................................... G03B 27/78
[52] U.S. Cl. .................................... 355/68; 356/443; 355/83
[58] Field of Search .................. 355/68, 83, 38, 77; 356/175, 202, 203, 404, 443, 444

[56] References Cited

U.S. PATENT DOCUMENTS

| | | | |
|---|---|---|---|
| 2,952,780 | 9/1960 | Rogers, Jr. ............... | 355/68 X |
| 3,049,050 | 8/1962 | Thomas .................... | 355/68 X |
| 3,074,312 | 1/1963 | Olson ...................... | 356/443 |
| 3,506,352 | 4/1970 | Denner ..................... | 355/68 |

FOREIGN PATENT DOCUMENTS

1040601 9/1966 United Kingdom .................. 355/68

*Primary Examiner*—Michael L. Gellner
*Assistant Examiner*—W. J. Brady
*Attorney, Agent, or Firm*—Stevens, Davis, Miller & Mosher

[57] ABSTRACT

This invention relates to improvements in photographic printing exposure meters, and particularly to such a meter and having a light sensitive cell which produces an illuminance dependant electrical signal used in an electronic circuit, together with inputs of other parameters of printing density, to calculate values of printing density corresponding to the input values. The parameters inputs are related to contrast grade and speed index of photographic paper, and time duration of exposure to the illuminance given by the light sensitive cell. The meter can be used to determine what exposure time is required, for a photographic paper having a particular contrast grade and speed index, to give a particular value of printing density at the measured illuminance.

7 Claims, 3 Drawing Figures

PHOTOGRAPHIC ENLARGING EXPOSURE METERS

This invention relates to exposure meters to be used to determine the most desirable exposures for printing from photographic negatives or positives.

While the invention is described in the primarily with black and white printing, it applies equally to colour printing.

Meters are available to assist in determining grades of paper and exposure times for particular enlargers. These generally only attempt to measure a few particular light values such as a highlight, the darkest shadow, or a skin tone. Others merely measure an average of all tones present. They are generally not intended to enable the user to predetermine the effect of all light values present in the projected image and thus build up a mental picture of the complete enlargement before choosing exposure time. This is particularly important where it is necessary to vary the exposure over different areas of the print to obtain an enhanced effect when using papers of higher printing contrast than the range present in the negative.

The object of the present invention is to provide a meter which can be used to facilitate the obtaining of desired effects in enlarged photographic prints.

According to this invention there is provided a photographic printing exposure meter comprising a light sensitive cell connected to electronic circuitry controlling a display means registering a range photographic paper printing density values.

In accordance with this invention there is also provided a photographic printing exposure meter comprising: electronic circuitry having input means for individually receiving electrical signals representing values of the following parameters; illuminance; time duration of that illuminance; speed index of photographic paper; and contrast grade of photographic paper, each input means for the last three parameters being settable, over a predetermined range, to a value of its particular parameter, the input means for illuminance being operatively connected to a transducer which receives illuminance and converts it to a proportional electrical signal, the electronic circuitry including means for calculating values of photographic paper printing density given by any combination of input values, and means for displaying this density.

Further features of the invention provide for the electronic circuitry to be analogue logic circuitry and for the transducer to include a light sensitive electronic component.

There is also provided for the electronic component to be a silicon photodiode or phototransistor, and for the transducer to include an optical filter which can substantially filter out light which does not affect photographic paper.

Still further, there is provided for the input means for values of contrast grade of photographic paper to have separately settable inputs for contrast grade values corresponding to values of photographic paper printing density above and below that given by the speed index of a photographic paper.

The invention is further described below with reference to the following drawings in which.

Figure 1:
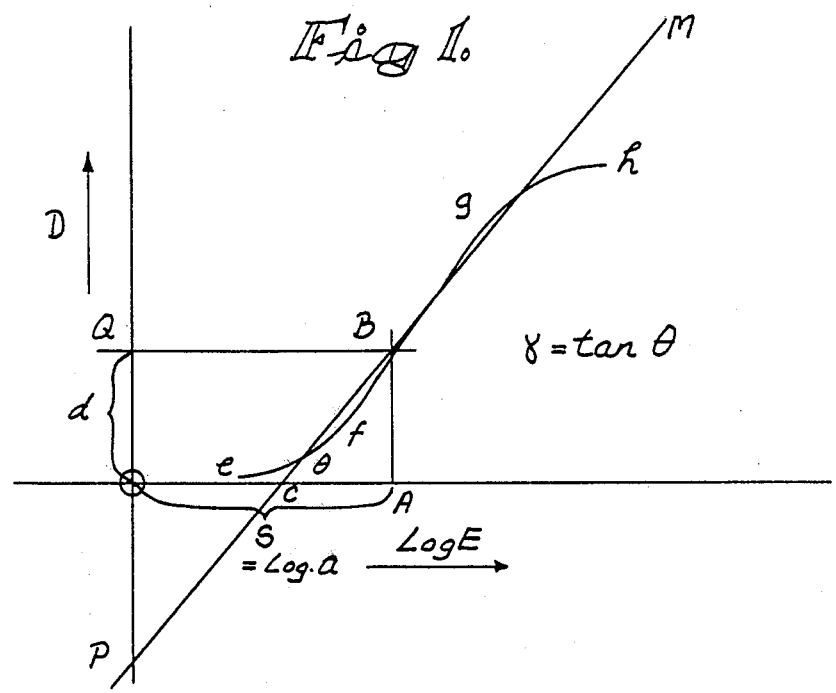
FIG. 1 is a graph of printing density D against the logarithm of exposure E for a given grade and speed index of photographic paper.

Referring to FIG. 1, exposure $E = TL$, where T is the time of exposure of photographic paper to illuminance L. The printing density D is the logarithm of the quotient of the amount of light reflected from the basic white of printing paper divided by the amount of light reflected from the part of the paper exposed to exposure E. The speed index S required to produce a density d in a given paper at an exposure a is indicated on the graph.

The logarithmic graph of exposure against density for predetermined standard grades of paper can be determined experimentally. Photographic manufacturers usually arrange for these curves to intersect each other at a particular density (usually mid-grey for black and white paper); the speeds for these particular shades are thus made constant irrespective of the grade of paper. However, should the curves not interest the speed may still be determined.

The graph referred to above, the terms and definitions and the above discussion of speed indices will be readily understood by those skilled in the art.

Still referring to FIG. 1, the straight line portion of the logarithmic curve may often be represented by the straight line PM without appreciable error. In some cases two intersecting lines may be required to produce an adequate approximation. Considering only the case of single line:

The slope of this line PM is $\gamma = \tan \theta$ and its equation is therefore $$D = \gamma \log E - OP$$

$$\text{but } OP = \gamma OC = \gamma(OA - CA) = \gamma OA - \gamma CA = \gamma OA - AB$$

but $OA = S = \log a$ and $AB = d$ $$\therefore OP = \gamma \log a - d$$
$$\text{and } D = \gamma(\log E - \log a) + d$$
$$= \gamma \log \frac{TL}{a} + d \qquad \text{equation 1}$$

Equation 1 is the logarithmic equation giving a solution to the density D in terms of the parameters grade of paper $\gamma$, speed index of paper a and predetermined density of paper d at the speed index.

Thus for a paper of known grade and speed index, the time and illuminance may be varied to obtain a desired density D.

Referring again to FIG. 1, the scales of the graph may alternatively be transposed to linear scales. The resulting curve may then be approximated to a straight line.

The mathematical formula for this straight line $y = mx + c$ can then be converted to analogue electronic circuitry equivalent to:

unknown density = grade of paper (exposure − speed index) + density at speed index.

However, it is preferred to use the logarithmic equation, Equation 1, for conversion to analogue logic circuitry. This preferred embodiment is described below with reference to FIGS. 2 and 3.

Figure 2:
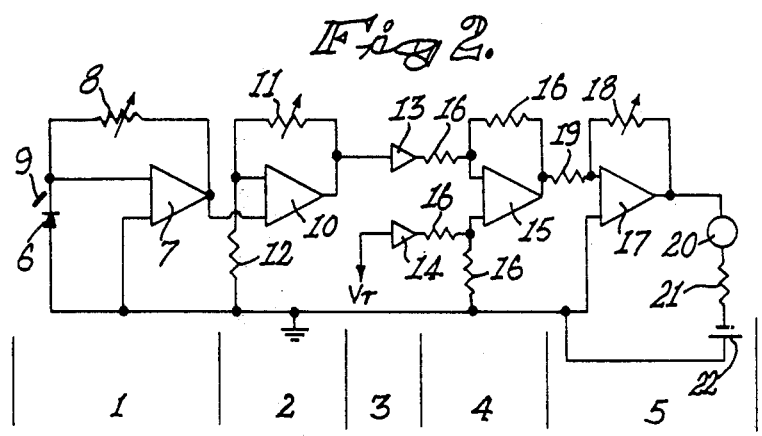
FIG. 2 is a diagrammatic representation of an analogue electrical circuit using logic derived from a logarithmic equation.

The diagrammatic representation of analogue circuitry in FIG. 2 is divided into five stages indicated by numerals 1 to 5, for the purposes of explanation.

Stage 1 has a photo cell 6 connected between earth and the inverting input of an operational amplifier 7. The non-inverting input of the operational amplifier 7 is connected to earth, and a variable feedback resistor 8 provides feedback current to the inverting input.

The photocell receives light of illuminance L from an enlarger in use. The light passes through an optical bandpass filter 9, which filters out light having wavelengths to which photographic paper is not sensitive. This applies particularly to light radiated by safe lights in developing rooms and in addition removes infra red light. When printing colour prints, a suitable colour filter would be used.

In use, the feedback current through resistor 8 ensures that the voltage at the inverting input remains the same as the voltage at the non-inverting input, i.e. zero. With the diode connected as described, the current 1 generated by it as a result of illuminance L is substantially proportional thereto. Since the voltage ouput of the stage 1 amplifier $V_{01}$ is the product of I and the volume of resistor 8, the voltage output is proportional to the exposure TL if resistor 8 is chosen to represent time T.

$$V_{01} \, \alpha \, TL \quad \text{Relation 1}$$

$V_{01}$ is then fed into stage 2, which is an operational amplifier 10 in non-inverting configuration having inverting input supplied by the voltage divider formed by variable feedback resistor 11 and resistor 12 which is connected between amplifier 10 output and earth. The gain of amplifier stage 2 is adjusted by feedback resistor 11 to be proportional to 1/a, or the inverse speed index exposure of the paper being used. The voltage output $V_{02}$ of amplifier 10 of stage 2 is thus:

$$V_{o2} \, \alpha \, \frac{1}{a} \, V_{o1} \text{ and from Relation 1}$$
$$\alpha \, \frac{TL}{a}$$
$$= \frac{kTL}{a} \text{ where } k \text{ is a circuit constant} \quad \text{Equation 2}$$

Stage 3 has two logarithmic amplifiers 13 and 14. These amplifiers have a transfer characteristic of K log $V_{in}$+c where K and c are constants dependant on the circuit, and $V_{in}$ is the voltage at the amplifier input.

The voltage output of stage 2 $V_{02}$ is fed into logarithmic amplifier 13 and this amplfier therefore has an output voltage $V_{03}$ given by:

$$V_{o3} = K \log V_{o2} + C \text{ and from Equation 2}$$
$$= K \log \frac{kTL}{a} + C \quad \text{Equation 3}$$

The input of the other logarithmic amplifier 14 is connected to a reference voltage $V_r$ and its output $V_{or}$ is therefore:

$$V_{or} = K \log V_r + C \quad \text{Equation 4}$$

It should be noted that these logarithmic amplifiers are available in multiple packages, for example type SN 76502, and are matched. This means that the constants K and c are very similar for both logarithmic amplifiers.

Stage 4 is a balanced differential input amplifier including an operational amplifier 15 and resistors 16 having known configuration and relative values. It has an output voltage $V_{04}$ transfer characteristic given by:

$$V_{04} = \beta(V_2 - V_1) \quad \text{Equation 5}$$

where $\beta$ is the amplifier gain, $V_2$ is the voltage at the non-inverting input and $V_1$ is the voltage at the inverting input.

The voltages $V_{03}$ and $V_r$ are fed into the inverting and non-inverting inputs of the stage 4 amplifier respectively. Substituting Equations 3 and 4 in Equation 5, we have:

$$V_{o4} = \beta((K \log V_r + C) - (K \log \frac{kTL}{a} + c))$$
$$= -\beta K (\log \frac{kTL}{a} - \log V_r)$$
$$= -\beta K \log (\frac{k}{V_r} \frac{TL}{a}) \quad \text{Equation 6}$$

With reference voltage $V_r$ chosen and preset to a value equal to constant K, Equation 6 becomes $$V_{o4} = 1 \, K \log (TL/a) \quad \text{Equation 7}$$

Now when the exposure given by the illuminance L and time T is equal to the speed index exposure a, $V_{04}$ will be zero.

Stage 5 is an inverting amplifier using an operational amplifier 17, variable feedback resistor 18 and input resistor 19. Its voltage output $V_{05}$ characteristic is given by:

$$V_{o5} = \alpha \gamma V_{in}$$

where $\alpha\gamma$ is the amplifier gain, $\gamma$ is a measure of the paper contrast grade and $\alpha$ is a constant.

Thus $\alpha\gamma$ is adjustable through variable feedback resistor 18, and $V_{in}$ is the input voltage. With stage 4 amplifier output voltage $V_{04}$ fed into stage 5 amplifier, we have:

$$V_{o5} = \alpha\gamma(-\beta K \log \frac{TL}{a})$$
$$= \alpha\beta K \, \gamma \log \frac{TL}{a} \quad \text{Equation 8}$$

The output voltage $V_{05}$ is connected through a microammeter 20 having a meter resistance 21 to a negative reference voltage 22 which is earthed on the positive side. For this circuit portion we have:

$$I_m = (V_m + V_{ref})/R_m \quad \text{Equation 9}$$

where $I_m$ is the current in the meter 20,
$V_m$ is the voltage over the meter 20,
$V_{ref}$ is the voltage reference 22, and
$R_m$ is the meter resistance 21.

The voltage reference $V_{ref}$ is chosen to be equal to Kd, where d is the density of the photographic paper used when exposed to the paper speed index exposure a. Applying this and Equation 8 to Equation 9 gives:

$$I_m = (\alpha\beta K\gamma \log \frac{TL}{a} + \alpha\beta Kd)/R_m$$
$$= \frac{\alpha\beta K}{R_m}(\gamma \log \frac{TL}{a} + d) \qquad \text{Equation 10}$$

This means that when the exposure a, $I_m$ will be proportional to the density d at exposure a.

It will be observed that the term in brackets in Equation 10 is the same as that in Equation 1 which gives the solution to density D. Applying Equation 1 to Equation 10:

$$D = I_m R_m / \alpha\beta K,$$

and the density D is proportional to the microammeter current Im; the meter will therefore read proportionally to density D. the constant term $RM/\alpha\beta K$ may be chosen to allow the meter to read D directly.

It will be appreciated that by adjustment of the gains of the amplifier stages 5 and 2, respectively representing contrast grade and speed index, an exposure meter using this analogue logic can be set to a predetermined combination of constrast grade and speed index of photographic paper.

Similarly, the gain of amplifier stage 1, representing time T may be adjusted in conjunction with adjustment of illuminance L falling on the photocell 6 to provide a reading of density D on the meter 20 at an exposure TL, for a paper having a contrast grade and speed index preset as described above.

By setting the above resistor controls, the parameters of time duration T, speed index S and paper contrast grade γ are settable to values of their particular parameters.

The unit of increment used for the above settings and adjustments can be called a "step". The use of the term "stop" has already found general acceptance in photography and represents a doubling of the valve (such as time or aperture). This unit is too large for this application and therefore a "step" is defined as being equal to one sixth of a "stop", i.e. each stop represents a ratio=2 1/6:1 or 1,2246:1.

Figure 3:
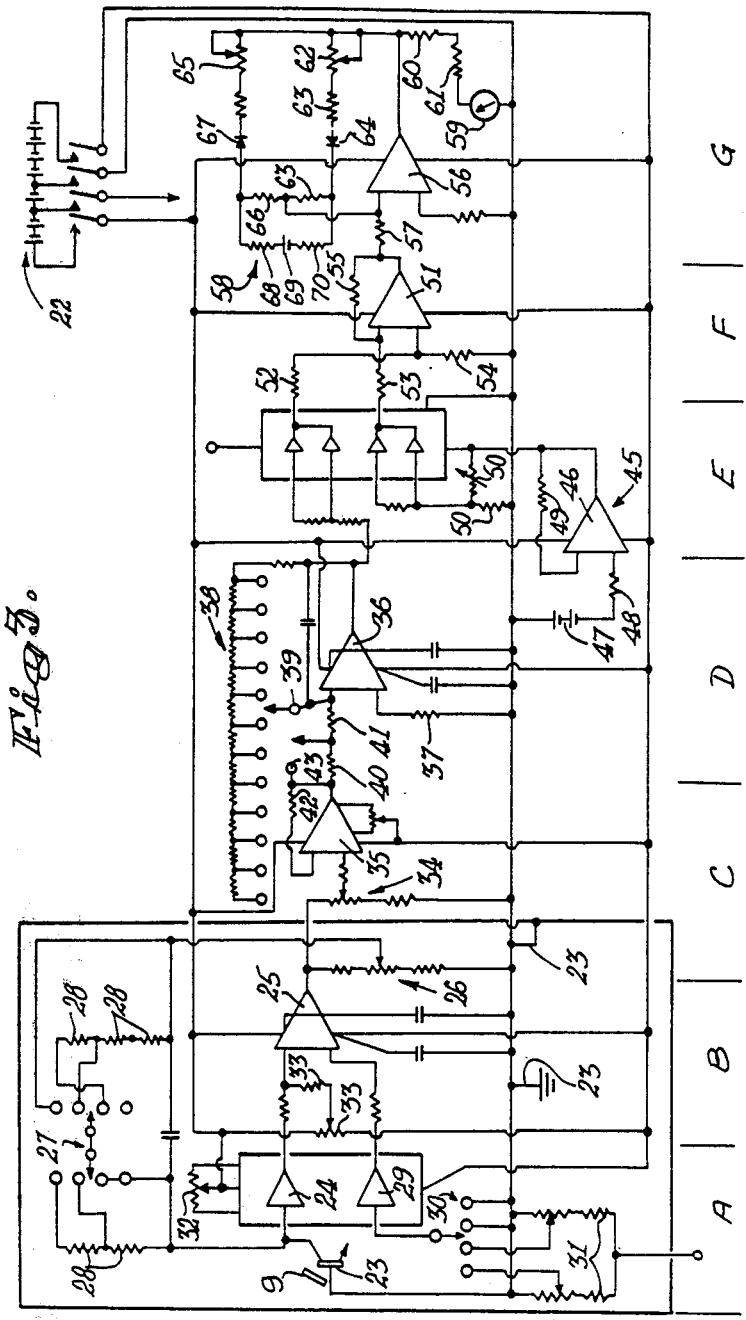
FIG. 3 is a complete electronic circuit diagram using the analogue logic shown in FIG. 2.

The preferred embodiment of the diagrammatic analogue logic circuitry in FIG. 2 is shown in FIG. 3. This circuit is powered by seven 1½ V dry cells 22, giving voltages of +4.5 V, +1.5 V, −6 V and earth. This circuit earth is grounded to the exposure meter chassis at 23. It is to be understood that any 741 operational amplifiers referred to below are supplied with +4.5 V and −6 V.

The circuit has been divided into seven stages, indicated at A to G, for explanatory purposes.

Stages A and B correspond to stage 1 in FIG. 2. The same optical filter 9 as described above is used, but the photocell is a silicon photo-transistor 23 with the collector and base in use and the emitter open. The base is earthed and the collector is fed into the inverting input of a Field Effect Transistor (FET) amplifier 24, which has a very high input impedance, and is supplied with +4.5 V and −6 V. The FET amplifier is one of a dual circuit amplifier in a HA2005 package. The output of the FET amplifier goes to the inverting input of a 741 operatonal amplifier (opamp) 25 in Stage B. The output of opamp 25 is taken off a voltage divider 26 through a rotary step switch 27 to provide feedback to the FET amplifier 24 input. The step switch 27 selects values of feedback resistors 28 to be switched into the feedback loop. The voltage divider 26 is provided to obtain a standardised output from stage B and only requires adjustment during assembly or when the phototransistor is replaced.

This variable resistor feedback facility provides the coarse time T setting and corresponds to the variable feedback resistor 8 in stage 1 of FIG. 2.

However, when the higher values of feedback resistors 28 are selected they disturb the zero balance of the amplifiers in stage A and B in spite of the high input impedance of the FET amplifier 24 and the zero voltage biasing of the phototransistor. This disturbance is caused by leakage current in the phototransistor and FET amplifier. The non-inverting input of the other HA2005 FET transistor amplifier 29 is therefore connected to preset positive potential to offset the effect of the leakage currents. These preset potentials are indicated at 30 and are supplied through taps on voltage dividers 31 connected between +1.5 V and earth. The connecting points at 30 are switched to the correct pre-set voltage for a particular feedback resistor by the rotary step switch 27, which has a separate set of rotary contacts for this purpose.

The resistors 28 switched by step switch 27 into the feedback loop are chosen to provide adjustments of 10 "steps" (one step=1/6 stop) at a time from 0 steps to 30 steps, for the coarse time control. Step 0 represents two seconds.

Two zeroing control are provided for the amplifiers 24, indicated at 32 and 33. Adjustment of these controls is made to obtain minimum drift with temperature.

The output of stage B opamp 25 is taken through a further, variable, voltage divider 34 to earth. The tap on this voltage divider goes to the non-inverting input of 741 opamp 35 of stage C. Adjustment of the variable voltage divider 34 and thus the input to stage C opamp 35 provides a fine adjustment for time T.

The fine time control is continuous being a potentiometer, and is scaled from 0 to 11 steps.

Stage D provides paper speed index setting and corresponds to stage 2 in FIG. 2. It has a 741 opamp 36 with non-inverting input earthed through resistor 37. Feedback is provided to the inverting input through feedback resistors 38 which are selected and switched into the feedback circuit by rotary step switch 39.

The output of stage C opamp 35 is connected to the inverting input of stage D opamp 36 through two series resistors 40 and 41. This output is fedback via resistor 42 to the inverting input of opamp 35. A switch 43 connected to opamp 36 output enables the first series input resistor 40 of stage D opamp 36 to be shortcircuited. The values of the resistors 40 and 41 are chosen to give the stage D amplifier a gain of +10 steps more if the input resistor 40 is shortcircuited by switch 43. The values of resistors 38 give the gain of the stage D opamp (representing the speed index setting) an adjustment facility of 5 to 16 "stops" in increments of one "step". This range combined with the +10 "step" facility provided by switch 43 gives a total range of 5 to 26 "steps". Note that the gain values of stage D are the inverse of speed index a to give the 1/a product explained above.

Stage E corresponds to Stage 3 of FIG. 2. An SN76502 logarithmic amplifier 44 is supplied with +1.5 V, earth, and −2.8 V regulated voltage supply.

The regulated voltage supply is indicated generally at 45, and consists of a 741 opamp 46 connected as a voltage follower. Two mercury cells 47 supply voltage input through resistor 48, and resistor 49, having a value equal to resistor 48, is in the feedback circuit.

The reference voltage of FIG. 2 is supplied in this circuit by tapping the regulated voltage supply 45 through a variable resistor voltage divider 50. The variable resistor of the voltage divider is used to preset the references voltage Vr to a value as described above.

Stage F corresponds to stage 4 of FIG. 2, i.e. it is a balanced differential voltage input amplifier performing the function as described above with reference to FIG. 2. It has an 741 opamp 51 with resistors 52, 53, 54 and 55 in typical differential amplifier configuration. It will be appreciated by those skilled in the art that resistor 52 must be equal to resistor 53 and resistor 55 equal to resistor 54 for a balanced amplification.

Stage G corresponds to Stage 5 of FIG. 2. It has 741 opamp 56 in inverting amplifier configuration with input resistor 57 and a feedback network indicated generally at 58.

The opamp 56 output drives an ammeter 59 which is in series with a resistor 60 and variable resistor 61 to earth. The meter 59 is a centre zero 100-0-100 microammeter.

The scale of the meter is marked 1 to 9 in increments of one, with 5 at zero point. This calibration corresponds roughly with the Ansel Adams Zone System. It should be noted that this scale is reversed in relation to a density scale. The meter is thus calibrated for a speed index density d of 5, i.e. middle grey. Clearly the scale may be calibrated to give a different value of speed index density d at the centre zero point. This arrangement is convenient since it eliminates the need for the reference voltage 21 in FIG. 2, which is required to hold the meter at the speed index density when the stage 5 (FIG. 2) amplifier output is zero.

The variable resistor 61 allows the meter scale to be adjusted during assembly by setting the circuit constants.

Referring now to the Stage G feedback network 58, it will be recalled from the discussion of corresponding Stage 5 (FIG. 2) that the gain of these stages provides the setting for the paper contrast grade $\gamma$. It will also be recalled that this invention provides for separate adjustment of density values D above and below the speed index density d. This corresponds with the approximation to the curve by using two intersecting lines.

The feedback network 58 provides this separate adjustment facility. It has a variable resistor 62 in series with two other resistors 63 and a silicon diode 64 forward biased when the opamp output is positive. This is in parallel with an exactly similar variable resistor 65, resistors 66 and silicon diode 67, with the exception that the silicon diode 67 is forward biased when the opamp output is negative.

When the stage G opamp 56 output is positive, diode 64 feedback circuit will be in use and variable resistor 62 will adjust the gain or paper contrast grade $\gamma$. Diode 67 will be reverse biased and therefore not conduct.

When the stage G opamp 56 output is negative, diode 67 feedback circuit will be in use and variable resistor 65 will adjust the gain or paper grade $\gamma$. Diode 64 will now be reverse biased and non-conducting.

Since zero voltage output of Stage G opamp 56 gives the speed index density d on the meter, the above separate adjustment for amplifier gains when the amplifier output is above and below zero voltage, provides separate paper grade $\gamma$ adjustments above and below the speed index density d.

A resistor 68, mercury cell 69 and further resistor 70 all in series, are connected parallel to the resistor 66 and 63 that is nearest the input of opamp 56. The mercury cell 69 forward biases both diodes 67 and 64, and serves to offset the forward conducting voltages of these diodes.

In use, the exposure meter is set to the correct speed index and grade of the paper being used. These parameters of photographic paper are not usually supplied by the manufacturers, and may be determined by any suitable method. The most convenient method is to use the exposure meter to do this; this use of the exposure meter will be described shortly.

With the above parameters set on the exposure meter, the enlarger is set up in the usual way, with the diaphragm of the projector lens adjusted to suit the photographer.

Starting with the area including the main subject of the picture, the time control of the meter is adjusted to give density readings on the ammeter which will render the subject of the picture as the photographer wishes to print it.

If for the paper selected and preset on the meter controls the contrast between the darkest and lightest area tested is too great, the ammeter will show printing density values beyond those desired by the operator. In the extreme the meter may even move above full scale and below zero. If this is not what is required a paper having a lesser contrast grade should be chosen and preset on the meter. Thus the grade setting on the exposure meter may be adjusted to find what grade of paper is required to give the desired range of contrast.

Conversely, if the ammeter indicates that the printing density contrast range is too narrow, (i.e. the meter readings do not extend far enough), grade settings of lower values may be tested until a suitable contrast grade can be found.

The exposure meter is now shifted to read at other parts of the picture. If these parts are not rendered suitably at the exposure time selected for the main subject of the picture, shorter or longer exposure times may be tried to obtain the desired effect. If this occurs, the parts requiring different exposure times from the main subject will have to be exposed using the usual techniques of "dodging" or "burning in". The exposure times for these techniques will be those indicated by the meter.

We return now to the use of exposure meter to determine paper speed and grade. For this purpose a calibrated negative having sequential segments each having one "step" more light transmission than its predecessor is used. It is convenient for the segments to be arranged in a circular pattern and preferably the whole area of the segments should be as small as possible. This latter requirement is so that when the calibration negative is projected through an enlarger, the intensity of light over the whole segmented area can be assumed to be constant.

It is also preferable to have at least 40 segments available on the calibration negative. The step approximately halfway between the total number of steps is marked for reference.

The contrast grade or slope of the paper $\gamma$, is defined for this use as the number of "steps", as above described, lying between the maximum exposure that will produce the faintest discernable grey (or tone of any colour) and the minimum exposure that will produce a full black (or deepest colour). Note that this measure of contrast grade is on an inverted scale when compared with one typical commercial contrast grade scale, i.e. a No. 1 paper will have a large number of steps whilst a No. 5 paper will have a small number of steps. The calibration negative is placed in an enlarger and projected to occupy a suitable area, say 6 to 7 cm diameter. The exposure meter is now set to a convenient time (say ten seconds) and an average paper speed is assumed and set on the exposure meter. The exposure meter photocell is operatively placed in the area of the projected image occupied by the halfway segment which has been marked as above described.

The enlarger projector lens diaphragm is now adjusted so that the ammeter needle indicates a printing density chosen to represent the speed index of the paper to be calibrated.

The paper to be calibrated is then exposed under these conditions for the time pre-set on the exposure meter.

The paper is then developed, dried and fixed, under standardised conditions. The segment on the print having the density chosen for speed index is located by comparison with a standard having the same density.

If the segment thus located differs from the reference segment on the calibration negative, the number of segments between them is counted.

This difference is added to or subtracted from (depending on the direction of the difference, i.e. towards a darker or lighter segment) the assumed paper speed.

The number of segments between the segment having the faintest discerntable grey and the corrected speed index segment is counted, as are the number of segments between full black and the corrected speed index segment.

These two numbers will be approximately the same if the speed index is middle grey and the paper characteristic curve is symmetrical about this speed index.

Whether this is so or not, the total range of contrast is given by the sum of these two members. The number of steps can be calculated from the sum of the segments. In this example, each segment is one step, but segments representing more or less than one step may be used.

Since the paper grade control is calibrated in steps, this step value may be set on the control directly. Similarly, the speed index control may be set directly to the correct speed index.

However, if the paper grade characteristic is asymmetrical, the number of steps of density above the paper speed index may be set on the exposure meter grade control that adjusts this higher (1–5) range of grades. The number of steps of density below the paper speed index may be set on the lower (5–9) grade ranges.

Once a sample of a batch of photographic paper has been thus calibrated, the same calibration applies to the rest of the batch.

In general, a chart giving equivalent values of time "steps" in seconds is provided. This enables time in seconds to be converted to "steps" of time for either setting or reading the time controls.

Further, it will be appreciated that by holding any three of the input parameters constant, the fourth parameter may be determined for a desired printing density.

The 1½ V dry cells 22 are preferably 'pen-light' cells, and will last 12–20 hours if the meter is used continuously. However, for average intermittant use the batteries should not require replacement more than once a year.

Clearly many variations of the preferred embodiment are possible without departing from the scope of the invention. For example, the electronic circuitry may be designed otherwise but perform the same function. The photocell input stage may have added temperature stability means and the time control calibration may be in seconds and not "steps" to facilitate reading and setting. Any further adaptations necessary for the latter facility, such as increased voltage operating range of the amplifiers, may be provided. Any suitable photocell may be used instead of a photo transistor.

What I claim as new and desire to secure by Letters Patent is:

1. A photographic printing exposure meter comprising a light sensitive cell for producing an illuminance dependant electrical signal, electronic circuitry connected to receive this signal and other predetermined signals related to parameters other than illuminance which affect printing density, to produce an output signal applied to a means for displaying a value of printing density of photographic paper characterized in that the electronic circuitry includes input means for receiving individually predetermined signals relating to the time duration of the illuminance, speed index of the photographic paper and contrast grade of photographic paper and is adapted to calculate and produce an output signal related to printing density and the display means is operable by this output signal over a range of values.

2. A photographic printing exposure meter as claimed in claim 1 wherein any one, any two, or all of the input means for values of time duration of illuminance, speed index of photographic paper and contrast grade of photographic paper is set at a fixed value of its particular parameter.

3. A photographic printing exposure meter as claimed in claim 1 wherein the input means for values of contrast grade of photographic paper has separately settable inputs for grade values corresponding to values of photographic paper printing density above and below that given by the speed index of a photographic paper.

4. A photographic printing exposure meter as claimed in claim 3 wherein either one or both of the input means for values of time duration of illuminance and speed index of photographic paper is set at a fixed value of its particular parameter.

5. A photographic printing exposure meter as claimed in claim 1 wherein the electronic circuitry is analogue logic circuitry.

6. A photographic printing exposure meter as claimed in claim 1 wherein the light sensitive cell is a silicon photodiode or phototransistor.

7. A photographic printing exposure meter as claimed in claim 1 wherein the light sensitive cell includes an optical filter which can substantially filter out light which does not affect photographic paper.

* * * * *